(12) United States Patent
Stovicek et al.

(10) Patent No.: US 9,225,820 B2
(45) Date of Patent: Dec. 29, 2015

(54) METHODS AND APPARATUS FOR SEARCHING A MESSAGE STORE

(71) Applicant: BLACKBERRY LIMITED, Waterloo (CA)

(72) Inventors: Thomas Jan Stovicek, San Francisco, CA (US); Kieran Cloud Del Pasqua, Toronto (CA)

(73) Assignee: BlackBerry Limited, Waterloo, Ontario (CA)

( * ) Notice: Subject to any disclaimer, the term of this patent is extended or adjusted under 35 U.S.C. 154(b) by 0 days.

(21) Appl. No.: 13/654,099

(22) Filed: Oct. 17, 2012

(65) Prior Publication Data
US 2013/0097173 A1    Apr. 18, 2013

Related U.S. Application Data

(60) Provisional application No. 61/548,131, filed on Oct. 17, 2011.

(51) Int. Cl.
*H04M 1/725*    (2006.01)
*G06F 3/0488*    (2013.01)

(52) U.S. Cl.
CPC ....... *H04M 1/72552* (2013.01); *G06F 3/04883* (2013.01)

(58) Field of Classification Search
None
See application file for complete search history.

(56) References Cited

U.S. PATENT DOCUMENTS

| | | |
|---|---|---|
| 2003/0064707 A1 | 4/2003 | Yoneyama |
| 2004/0143569 A1* | 7/2004 | Gross et al. .................. 707/3 |
| 2007/0088687 A1* | 4/2007 | Bromm et al. ................ 707/4 |
| 2008/0208812 A1* | 8/2008 | Quoc et al. .................. 707/3 |
| 2008/0311935 A1 | 12/2008 | Tysowski |
| 2012/0124071 A1* | 5/2012 | Gebhard et al. ............ 707/767 |
| 2012/0124072 A1* | 5/2012 | Vaidyanathan et al. .... 707/767 |
| 2012/0185498 A1* | 7/2012 | Loofbourrow et al. ..... 707/767 |

FOREIGN PATENT DOCUMENTS

| | | |
|---|---|---|
| EP | 0886228 A2 | 12/1998 |
| EP | 2144411 A1 | 1/2010 |

OTHER PUBLICATIONS

Extended European search report mailed Dec. 10, 2012, in corresponding European patent application No. 12188880.4.
Office Action issued in Canadian Application No. 2,792,765 on Dec. 9, 2014; 3 pages.
Communication Pursuant to Article 94(3) EPC issued in EP Application No. 12188880.4 on Aug. 5, 2015; 6 pages.
Office Action issued in Canadian Application No. 2,792,765 on Sep. 29, 2015; 4 pages.

* cited by examiner

*Primary Examiner* — Alex Gofman
*Assistant Examiner* — Umar Mian
(74) *Attorney, Agent, or Firm* — Fish & Richardson P.C.

(57) ABSTRACT

Methods and apparatus for searching a message store on a portable device are described herein. The methods allow a plurality of possible search criteria to be generated and displayed. One or more of the possible search criteria may be selected and added to a search string that is used to search the message store.

13 Claims, 11 Drawing Sheets

# METHODS AND APPARATUS FOR SEARCHING A MESSAGE STORE

CROSS-REFERENCE TO RELATED APPLICATION

This application claims priority to U.S. Provisional Application No. 61/548,131, filed Oct. 17, 2011, the contents of which are entirely incorporated by reference herein.

TECHNICAL FIELD

The present disclosure relates to searching a message store, and in particular to searching a message store on a portable device.

BACKGROUND

Portable devices, such as smart phones or tablets, are able to send and receive messages. For example the portable device may send and receive e-mail messages, short message service (SMS) text messages, and social networking messages, such as messages from Twitter™, Facebook™, LinkedIn™ or other social networks. Further the messages may include other types of information such as calendar appointments. The messages may be stored in one or more message stores on the device, or in one or more message stores on a remote server or device.

The messages in the message stores associated with the device may be searched using different search criteria, such as a name of a sender or recipient. Although the messages sent and received from the portable device may be of different types, the search functionality may provide a unified search to search all of the different message types. Typically each message, regardless of its type, will have a sender, recipient and a body, although other fields are possible. It is possible to include other types of information in the message store that can be searched. Typically, when searching the message store, a user inputs the information to search for in specific fields, so for example a user may input "Paul" in a From field. The search functionality will then search for all messages whose From field at least partially matches "Paul". A list of the messages resulting from the search may then be displayed to the user.

Although the search functionality provides adequate searching of messages, it can be difficult to specify the desired search criteria, especially on a portable device with limited display space. With the limited display space, it is undesirable to display input fields for all possible fields, which may not be used. Further, with the use of touch sensitive displays becoming more common, the need to switch between different input fields in order to input the various search criteria may be inconvenient for the user.

It would be desirable to have an alternative and/or improved method for searching message stores on a portable device, and in particular on portable devices having limited display space and/or a touch sensitive display.

BRIEF DESCRIPTION OF THE DRAWINGS

Further features and advantages of the present disclosure will become apparent from the following detailed description, taken in combination with the appended drawings, in which:

FIGS. 13 to 17 depict various criteria selection panes used for searching a message store;

DETAILED DESCRIPTION

In accordance with the present disclosure, there is provided a method for searching a message store on a portable device comprising: displaying a search input box; generating and displaying a plurality of possible search criteria for searching for messages in the message store; receiving a selection of one or more of the displayed plurality of the possible search criteria; and adding the selected one or more possible search criteria to a search string.

In accordance with the present disclosure, there is provided a portable device comprising: a touch sensitive display for displaying graphics and receiving touch input; a memory for storing instructions; a processor for executing the instructions, the instructions when executed by the processor configuring the portable device to: display a search input box on the touch sensitive display; generate and display a plurality of possible search criteria for searching for messages in the message store; receive a selection of one or more of the displayed plurality of the possible search criteria; and add the selected one or more possible search criteria to a search string.

In accordance with the present disclosure, there is provided a non-transitory computer readable memory containing instructions for searching a message store on a portable device, the instructions when executed by a processor performing: displaying a search input box; generating and displaying a plurality of possible search criteria for searching for messages in the message store; receiving a selection of one or more of the displayed plurality of the possible search criteria; and adding the selected one or more possible search criteria to a search string.

Although the following discloses example methods and apparatus including, among other components, software executed on hardware, it should be noted that such methods and apparatus are merely illustrative and should not be considered as limiting. For example, it is contemplated that any or all of these hardware and software components could be embodied exclusively in hardware, exclusively in software, exclusively in firmware, or in any combination of hardware, software, and/or firmware. Accordingly, while the following describes example methods and apparatus, persons having ordinary skill in the art will readily appreciate that the examples provided are not the only way to implement such methods and apparatus.

It will be appreciated that for simplicity and clarity of illustration, where considered appropriate, reference numerals may be repeated among the figures to indicate corresponding or analogous elements. In addition, numerous specific details are set forth in order to provide a thorough understanding of the embodiments described herein. However, it will be understood by those of ordinary skill in the art that the embodiments described herein may be practiced without these specific details. In other instances, well-known methods, procedures and components have not been described in detail so as not to obscure the embodiments described herein. Also, the scope of the teachings provided herein is not considered to be limited to the specific description of the embodiments provided herein. Embodiments are described below, by way of example only, with reference to FIGS. 1 to 20.

Methods and apparatus for searching a message store on a portable device are described herein. The methods allow a plurality of possible search criteria to be generated and displayed. One or more of the possible search criteria may be selected and added to a search string that is used to search the message store. The methods for searching a message store described herein, may be used advantageously on portable devices and in particular portable devices having a touch sensitive display, although a touch sensitive display is not required. The methods may also be used advantageously on portable devices having limited or constrained display screen size.

FIGS. 1 to 9 depict various display screens presented on a portable device used for searching a message store. It will be appreciated that the screens, panes and content described with regards to FIGS. 1 to 9 is only one embodiment for displaying messages. Other arrangements of screens, panes and content are possible depending upon various design considerations and device characteristics, such as screen size. For example, multiple panes are described for displaying various content; it is possible to display the content in a single pane, or multiple different panes or screens.

The portable device 100 is depicted in a horizontal orientation often associated with a tablet device, although the portable device 100 may comprise other portable devices such as a smartphone. The portable device 100 may be provide functionality such as voice and video calls, sending and receiving e-mails or other types of messages, viewing web pages, accessing content from remote sources, playing games or other types of entertainment, or other types of functionality. The functionality provided by the portable device 100 may make use of a wired or wireless communication interface. For example, the portable device may include one or more interfaces for connecting to or creating a cellular or mobile network, a wide area network (WAN), a local area network (LAN), or a personal area network (PAN). The portable device 100 comprises a bezel 102 and a touch sensitive display 104 that is used for both input and display.

Figure 1:
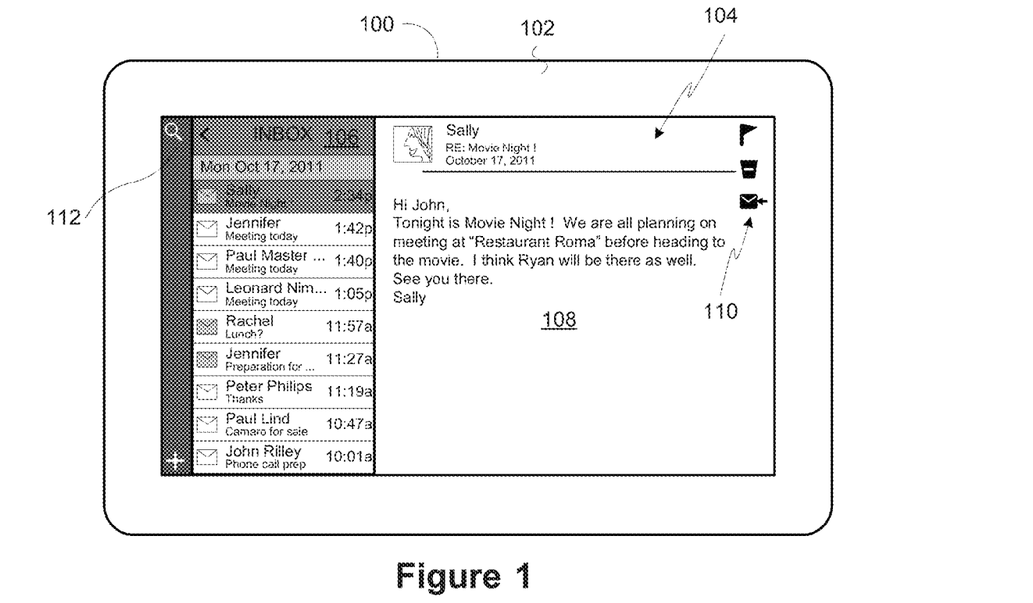
FIGS. 1 to 9 depict various display screens of a portable device used for searching a message store.

Turning to FIG. 1, a display screen of a messaging application is depicted. The screen comprises a message list pane 106, which displays a list of messages from one or more message stores, such as an e-mail account's Inbox as depicted. A single user of the portable device may have multiple different accounts, for example a personal e-mail account and a work e-mail account, as well as accounts for various social networks, and messages associated with a telephone number and/or a unique identifier associated with the portable device. The messages from the different accounts may be viewed separately or displayed together in a unified message list. Messages from the different accounts may be stored in separate message stores. Alternatively, messages from a plurality of accounts may be stored in the single message store. As will be appreciated, the messages displayed in the message list pane 106 may be ordered in various ways. The messages are depicted as being ordered by the date and time they were received. The message list pane 106 may display various information associated with each message. For example, as depicted, the name of the sender, a short title or subject and time of receipt may be displayed. Further, each message may be associated with an icon, such as an e-mail icon as depicted, providing additional information about the message, such as the message type. Different icons may be used to provide additional information such as if the message has been viewed or not by using different colors, shadings or images.

The screen further includes a preview pane 108 that displays the contents of a selected message from the message list pane 106. The preview pane may include one or more action icons 110 for performing different actions, such as flagging a message for follow up, moving the message to the garbage, and/or replying to the message.

Figure 2:
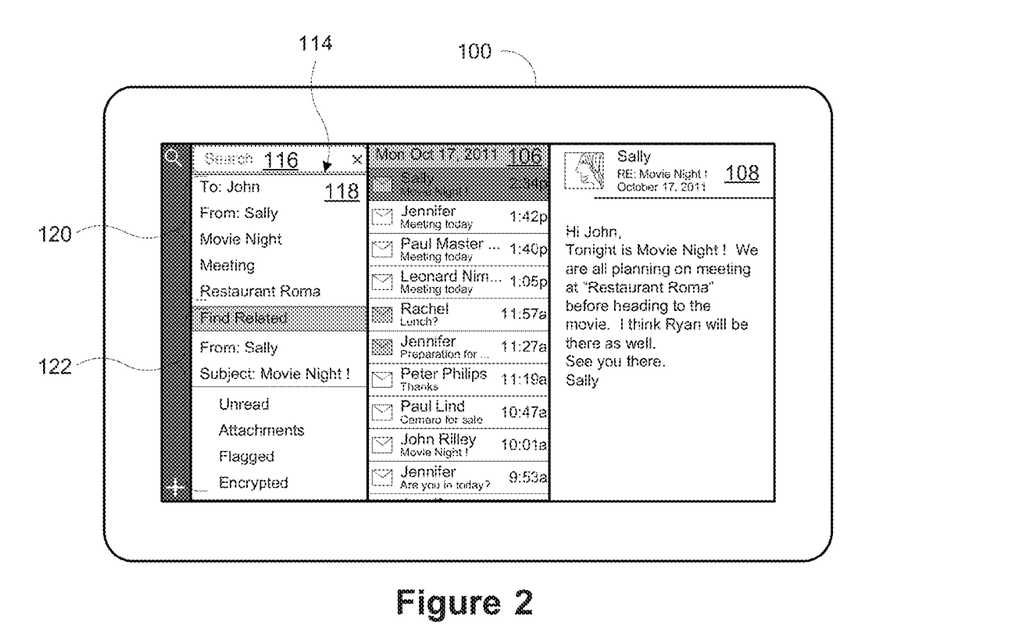

The screen may also include a search icon 112 for displaying a search pane 114 as depicted in FIG. 2. The search pane 114 allows a user to conveniently construct a search string to use in searching for messages, including messages of different types or accounts and messages stored in one or more different message stores. The search pane 114 may include a search input box 116 that displays search criteria of a search string and a criteria selection pane 118 that displays possible search criteria 120 that can be added to the search string. The search pane 114 may further comprise a search options pane 122 that displays other search options, such as searching for related messages from the sender or others of the currently selected message or searching for related messages having the same or similar subject. The search options pane 122 may include selectable filter options to be applied to the search, such as filtering the search results according to one or more characteristics of the messages, such as messages that are read, that are unread, that have attachments, that are flagged and/or that are encrypted.

When the user brings up the search pane 114, either by touching the search icon 112, performing a gesture associated with searching or other means such as selecting "search" from a menu or pressing a key or key combination associated with search functionality, the criteria selection pane 118 may be displayed. The criteria selection pane 118 may be initially populated with one or more default search criteria, with one or more previously used search criteria, with one or more generated search criteria or may be initially empty, that is populated with no search criteria.

The possible search criteria 120 that may be displayed in the search criteria pane 118, either when the search criteria pane is initially displayed or at a later time, can be generated based on at least contents of one or messages in the message store. For example, the possible search criteria 120 may be generated from a current message that is selected in the message list pane 106 and displayed in the preview pane 108. The possible search criteria 120 can be generated by extracting keywords from the message and then appending the keywords to one or more possible search fields. As depicted, the possible search criteria 120 populated from the current message include searching the To field for the recipient of the message, which is depicted as "John". It is noted that a single user may have multiple accounts that are displayed in the message list pane 106, and as such the To field may vary depending on which of the messages is currently selected. Other possible search criteria 120 that are populated from the current message when the search pane 114 is brought up may include searching the From field for the sender of the current message, depicted as "Sally". Additional possible search criteria may be generated from the current message. For example, keywords may be extracted from the current message and searched for in a particular message field to provide the possible search criteria 120. It is noted, that if no field is specified for a search criteria it may be searched for in all possible fields, or a subset of the possible fields such as a message body field and a subject field which may be set as a user preference.

As depicted in FIG. 2, various keywords are extracted from the body of the current message, namely "Movie Night", "Meeting" and "Restaurant Roma." Although only five possible search criteria 120 are depicted, it is possible to display additional possible search criteria. If additional possible search criteria are displayed, it may be necessary to provide scrolling functionality to the search pane 114 or the criteria selection pane 118. The scrolling may be provided by displaying scroll bars or using touch gestures or by keys associated with scrolling.

Figure 3:
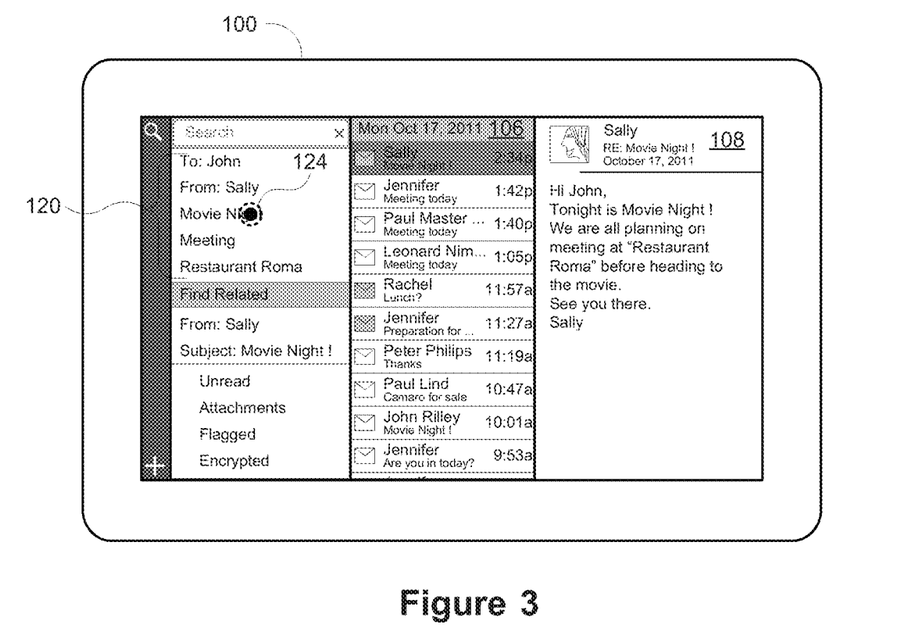

Once the possible search criteria 120 are generated displayed, a user may select one or more of the displayed possible search criteria 120, for example by touching the desired possible search criteria as depicted by circle 124 of FIG. 3. Although a touch interface is described, it is contemplated that one or more of the displayed possible search criteria can be selected in other ways, such as using menus, keys or other input devices. When one of the possible search criteria 120 has been selected it is added to a search string 126 used for searching the message store. The search string 126 may be an actual string that uses one or more special characters for allowing the search fields and the associated search term to be specified. Alternatively, the search string may be a collection of a plurality of individual search criteria that each specify a search field and a search term or terms for searching for in the search field. If no search field is specified in the search criteria, the search term or terms may be searched for in the default search field or fields.

Figure 4:
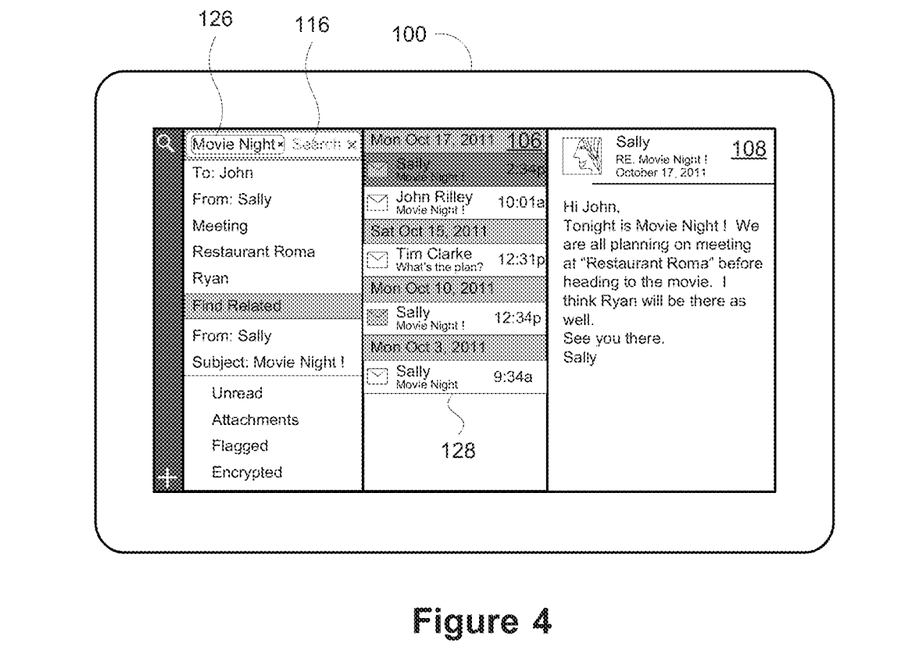

As depicted in FIG. 4, when a possible search criteria is selected, it is added to the search input box 116. The search string 126 is initially empty when a new search is initiated. Once a possible search criteria is added to the search string 126, the message store is searched for any messages matching the search criteria of the search string 126.

As depicted in FIG. 4, the user added the possible search criteria "Movie Night" to the search string 126. When the search string 126 is updated, a search may be started using the search string 126. Alternatively, a search may start upon a specific instruction from the user, such as pressing a search button or an 'OK' or other key. Regardless of when the search is initiated, the message store is searched for any messages that have any fields that at least partially match "Movie Night." Once the search is complete, or as messages are found that at least partially match the search string, the messages of the search result 128 are displayed in the message list pane 106.

In the example depicted, any message that includes the text "Movie Night" in any of its text fields will be displayed in the message list pane 106. The first result may be automatically selected and displayed in the preview pane 108.

When the user selects one of the possible search criteria 120, it is added to the search string 126 as a search criteria. The search string 126 may be displayed in the search box 116. The individual search criteria added to the search string 126 may be displayed in the search string as depicted in FIG. 4. When the possible search criteria 120 is added, it may be removed from the possible search criteria 120 displayed allowing additional possible search criteria to be displayed.

Figure 5:
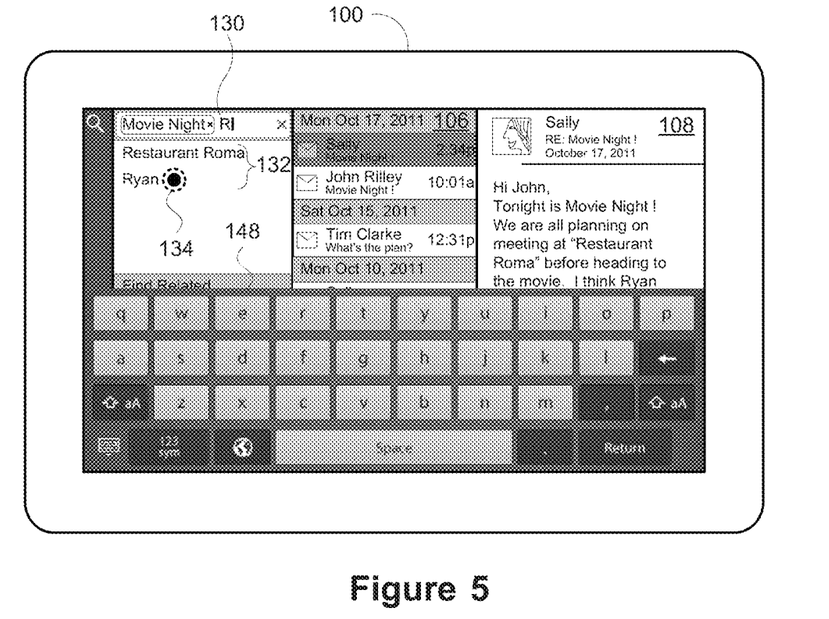
Figure 6:
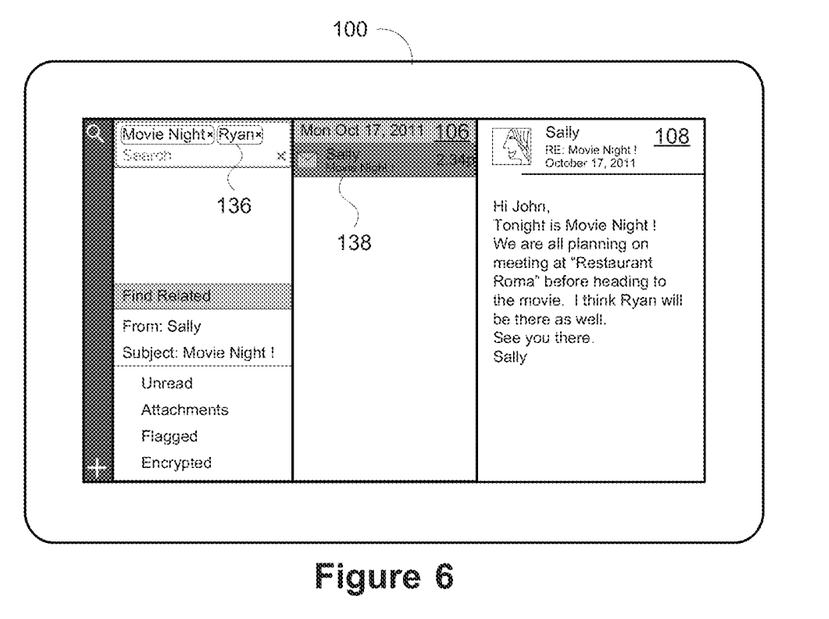

In addition to displaying the current search string 126 if any, the search input box 116 may also allow a user to input characters 130 as depicted in FIG. 5. When the user selects the search box 116, a keyboard 148 may be displayed to allow the user to input characters into the text box 116, alternatively other input techniques such as voice input may be utilized. The input characters 130 may not immediately form part of the search string 126, but rather may be used to generate additional possible search criteria, or refine the possible search criteria 120 displayed in the criteria selection pane 118. As depicted, a user may input the character "R", which may be used to filter the possible search criteria 120 generated from the content of the message. Filtering the possible search criteria 120 depicted in FIG. 4 using the input character 130 results in the refined possible search criteria 132 depicted in FIG. 5 being displayed, namely "Restaurant Roma" and "Ryan". A user may then select one or more of the refined possible search criteria 132 as depicted by the circle 134. As depicted in FIG. 6, when another possible search criteria is selected, it is added to the search string 126 to provide the new search string 136, which is used to refine the search of the message store.

The search using the updated search string 136 may be performed only on the messages of the previous search result displayed in the message list pane 106, or may be performed on the complete message store. If the refined search is only performed on the messages of the previous search results, it may be possible to only use the newly added search criteria, in which case the search string could be cleared prior to adding the refined possible search criteria 132.

Regardless of whether the search is performed on a previous search's results or the message store, the messages of the search results 138 are displayed in the message list pane 106. As depicted in FIG. 6, only a single message matches the search string 136. If no messages were found that match the search string the message list pane 106 may be empty.

The above has described that the characters entered are not added to the search string immediately, but rather are used to filter existing possible search criteria. It is possible to add the added characters to the search string either automatically after a length of time has elapsed without any additional selections or inputs being made by the user, or the characters may be added to the search string manually, for example by touching an icon, such as a check mark (not shown) depicted in proximity to the entered characters, or by other means of indicating that the characters should be added to the search string 126.

The possible search criteria 120 that can be displayed in the criteria selection pane 118 have been described as being generated based on at least a portion of the content of one or more messages in the message store, such as a currently displayed or selected message. As described above, it is possible to refine the possible search criteria that can be displayed by typing one or more characters into the search input box. As described further below, it is possible to generate and display the possible search criteria based on characters input into the search input box instead of from the current message.

Figure 7:
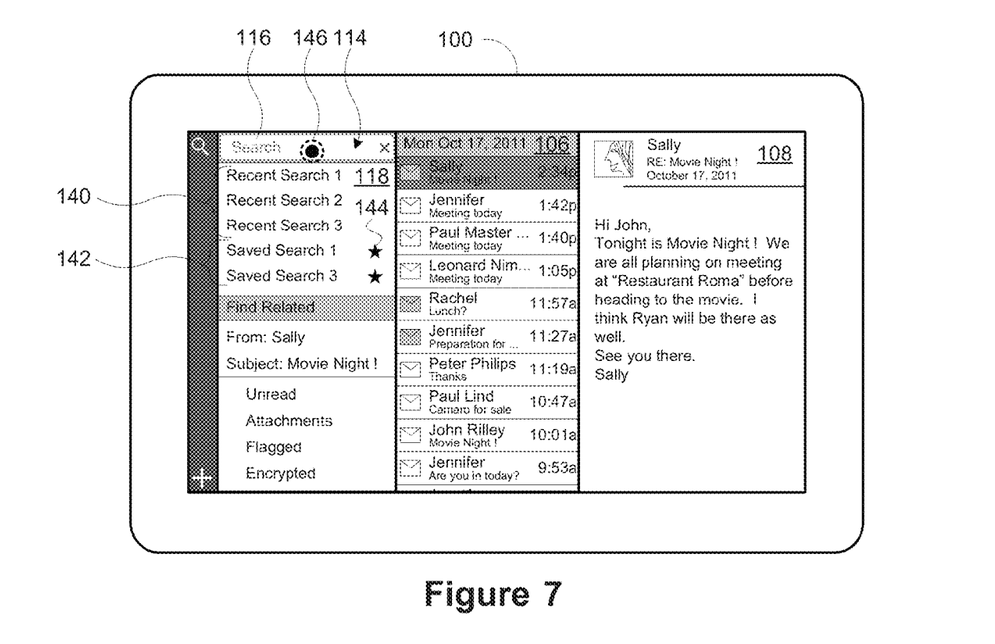
Figure 8:
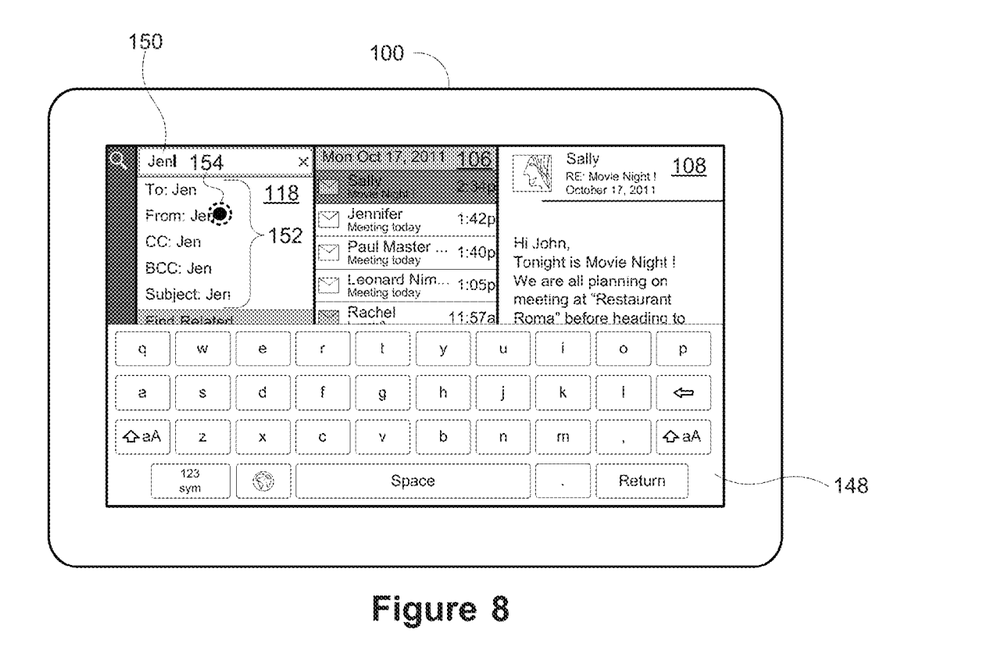

FIG. 7 depicts a screen when the search pane 114 is initially brought up. The criteria selection pane 118 is populated with recent searches 140 as well as any saved searches 142. A saved search may be indicated by an icon 144 such as a star. A user may delete a saved search by touching the star. Similarly a user may save a recent search, for example by touching an outline of a similar icon (not shown). When the search pane 106 is initially brought up, the focus is not placed to the search input box 116, since doing so would typically bring up a keyboard which may be undesirable. The user may select one or more of the possible search criteria, namely a recent search 140 or saved search 142. If one of the possible search criteria is selected, its associated search string is added to the search string and a search of the message store can be performed accordingly. If however, the user touches the search input box 116 as depicted by circle 146, the focus is switched to the search input box 116. Typically, when a text input box receives the focus, a keyboard 148 may be displayed as depicted in FIG. 8.

With the keyboard 148 displayed, the user may input characters 150 into the search input box. Rather than using the characters 150 to refine the possible search criteria that are displayed as described above, the characters 150 may be used to generate possible search criteria 152, which are subsequently displayed in the criteria selection pane 118. As depicted, the generated search criteria 152 may include criteria for searching different fields, such as To, From, CC (carbon copy), BCC (blind carbon copy), or Subject, for the input characters 150. For example, when the user inputs "Jen" into the search input box, search criteria are generated and displayed for searching for "Jen" in the To field ("To: Jen"), From field ("From: Jen"), CC field ("CC: Jen"), BCC field ("BCC: Jen") and Subject field ("Subject: Jen"). Once the possible search criteria 152 have been displayed, a user may select one as depicted by circle 154.

Figure 9:
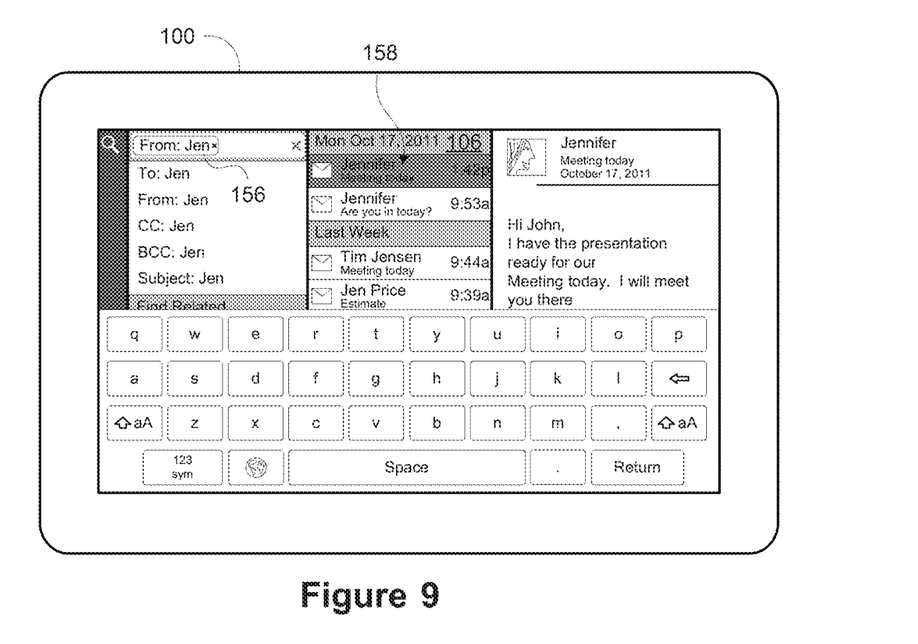

Selecting the possible search criteria adds the possible search criteria to the search string 156, which may be initially empty, and a search of the message store performed accordingly. Searching the message store for "From: Jen" will find all messages that were sent from a recipient that at least partially matches "Jen". The messages of the search results 158 are displayed in the message list pane 106. As depicted the search results include messages with a sender having "Jen" in part of their name. Once the selected possible search criteria 152 is added to the search string, the user may select another possible search criteria 152 to add to the search string. Alternatively, the user may again set the focus to the search input box 116. If the focus is returned to the search input box, as depicted in FIG. 9, the previously generated possible search criteria 156 may be replaced with the recent searches and saved searches, or the previously generated possible search criteria 156 may remain displayed. If the user subsequently enters characters into the search input box, they can be used to generate and display new possible search criteria, which may be subsequently used to refine the search results.

FIGS. 10 to 14 display various search input boxes 116 and criteria selection panes 116 as may be displayed when a user is searching for messages. The search input boxes and criteria selection panes depicted may be incorporated into the screens described above with regards to FIGS. 1 to 9, although it may be necessary to provide scrolling functionality in order to view all of the possible search criteria.

Figure 10:
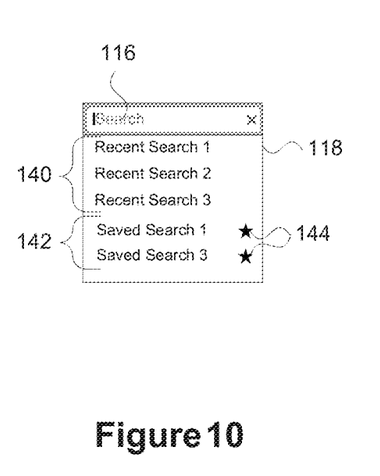
FIGS. 10 to 12 depict additional display screens of a portable device used for searching a message store.
Figure 11:
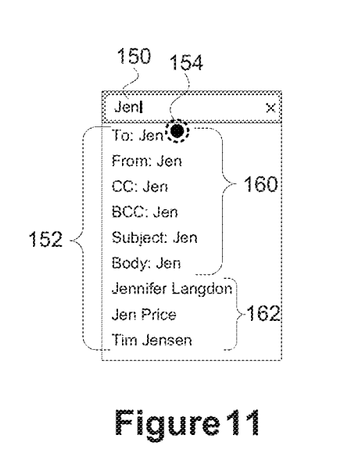

FIG. 10 depicts the possible search criteria when there are no characters in the search input box 116 and it has the focus. The criteria selection pane 118 displays the recent searches 140 and any saved searches 142, which may indicated by a star icon 144. As depicted in FIG. 11, as the user begins to type characters 150 into the search input box, possible search criteria 152 are generated and displayed. It is noted that the possible search criteria 152 are depicted as replacing the recent searches 140 and saved searches 142; however, they may also be added to and displayed with the recent and saved searches. The possible search criteria 152 may be generated by appending the input characters 150 to various message fields. The message fields to use in generating the possible search criteria 152 may be a subset of all possible message fields. Additionally, the message fields to use in generating the possible search criteria 152 may be selectively set by the user as an option. Additionally, possible search criteria 152 may be generated by using the input characters to search the user's contacts, in which case, the possible search criteria would include the name of any contacts that at least partially match the input characters. As depicted in FIG. 11, the possible search criteria include possible search criteria 160 generated by appending the input characters 150 to the appropriate message fields as well as possible search criteria 162 generated from appending the names of contacts that at least partially match the input characters 150 to appropriate message fields, such as the To or From fields.

Figure 12:
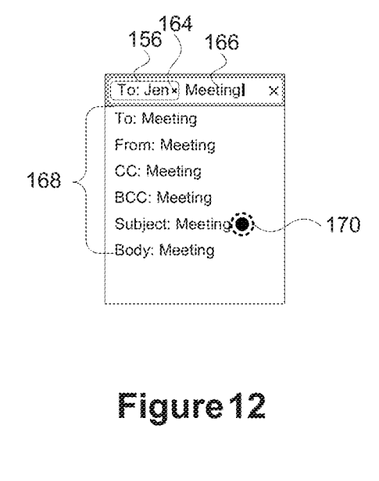
Figure 14:
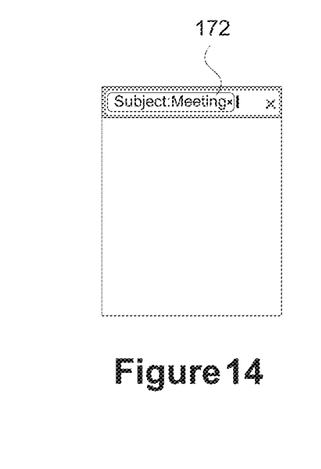

With the possible search criteria displayed, a user may select one of the possible search criteria 152 as indicated by circle 154, which causes the selected possible search criteria to be added to the search string 156 as a new search criteria as depicted in FIG. 12. Multiple possible search criteria 152 may be selected using various input combinations or touch gestures. Each search criteria of the search string may be displayed within a box or outline that includes an 'x' 164 as depicted. When a user touches the 'x' 164 the associated search criteria may be removed from the search string. Individual search criteria may be identified within the search input box using various means other than the box depicted. Further, other possibilities for removing a search criteria from the search string are possible in addition to, or as an alternative to, the use of the 'x' 164 as described. For example, a user may use a dragging gesture to 'pull' the desired search criteria from the search input box, or the user may double tap the desired search criteria or other gestures as desired.

Once a possible search criteria is added to the search string, the user may input more characters into the search input box, which are again used to generate and display possible search criteria 168. As depicted in FIG. 12, the user inputs "meetings" into the search input box, which causes possible search criteria to be generated by appending the characters to the various message fields, or a subset of the message fields. In the example of FIG. 12, it is assumed that there are no contacts that at least partially match the input characters "meeting" and as such no contact names are displayed as possible search criteria. Again, the user may select one of the displayed possible search criteria indicated by circle 170, which causes the possible search criteria to be added to the search string 172 as depicted in FIG. 13. A user may touch the 'x' associated with the individual search criteria of the search string 172 as indicated by circle 174, which causes the associated search criteria to be removed from the search string 172, resulting in the search string depicted in FIG. 14.

Figure 15:
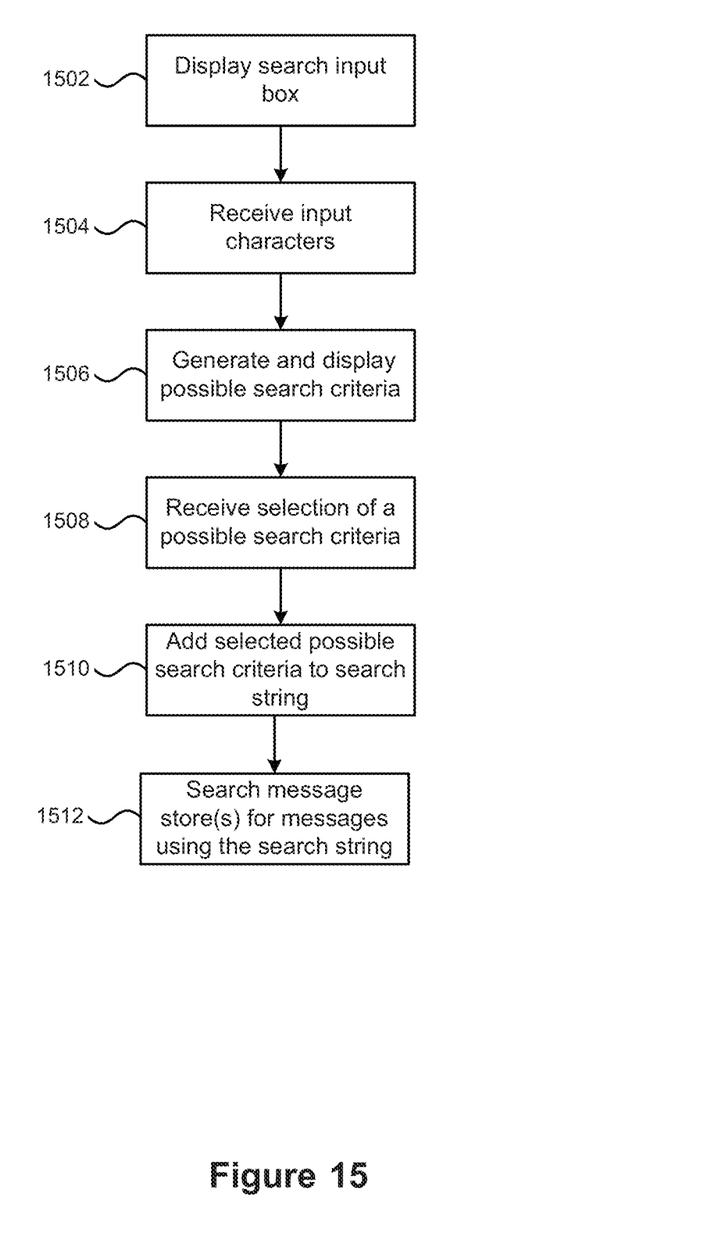

FIG. 15 depicts a method for searching a message store. The method 1500 displays a search input box (1502). A user may set the focus to the search input box and input characters into the search input box, which are received and displayed (1504). The method generates and displays a plurality of possible search criteria (1506). The possible search criteria may be generated based various information including one or more characters input into the search input box, content of one or more messages or combinations of input characters and message content. For example, the possible search criteria may be generated by appending the one or more characters to one or more message fields, or may be generated by appending a name of a contact at least partially matching the one or more input character to an appropriate message field. A selection of one or more of the displayed possible search criteria is received (1508) and the selected one or more possible search criteria is added to a search string (1510). The search string may then be used to search one or more message stores for messages at least partially matching the search string (1512). The results of the search may be displayed.

Figure 16:
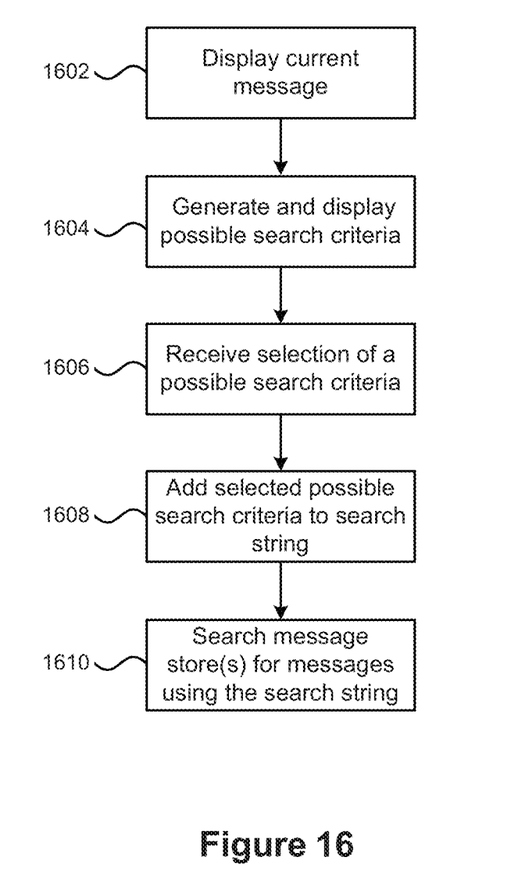

FIG. 16 depicts a method for searching a message store. The method 1600 displays a current message (1602). The method generates and displays a plurality of possible search criteria (1604). The possible search criteria may be generated based various information including one or more characters input into the search input box, content of one or more messages or combinations of input characters and message content. For example, the possible search criteria may be generated based on contents of the current message. The possible search criteria may be generated based on content of the fields of the current message. Additionally, possible search criteria may be generated from keywords within the current message. Keywords for use as search terms for search criteria may be extracted from one or more messages. The keywords may be added to one or more search fields to provide the possible search criteria. A selection of one or more of the displayed possible search criteria is received (1606) and the selected one or more possible search criteria is added to a search string (1608). The search string may then be used to search one or more message stores for messages at least partially matching the search string (1610). The results of the search may be displayed.

Figure 17:
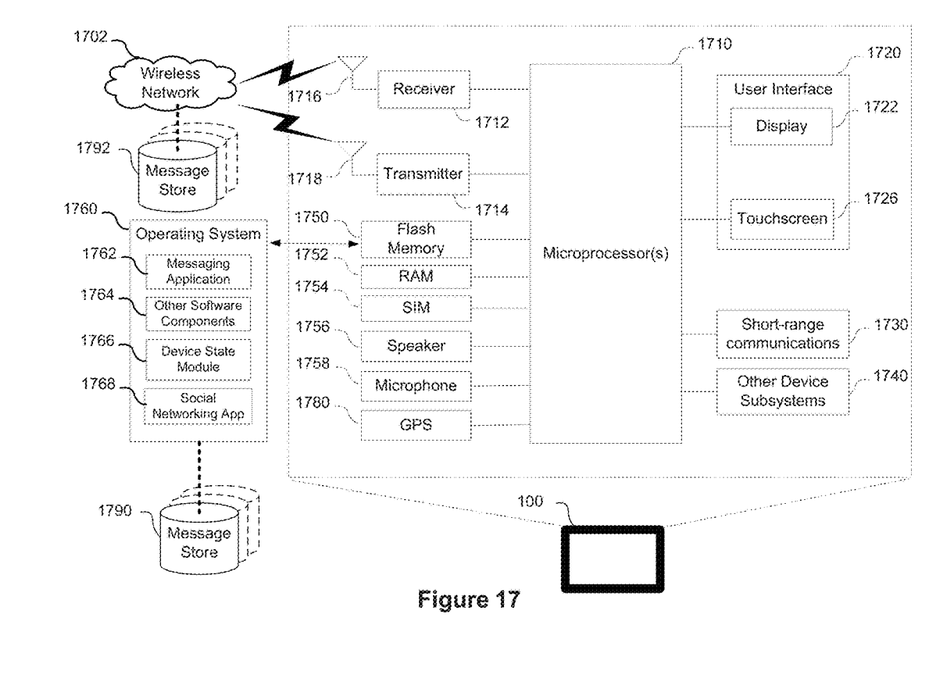

FIG. 17 is a schematic depiction of an example of a portable device that may implement the search functionality described above. As shown by way of example in FIG. 17, the portable device 100, includes a processor (or microprocessor) 1710 for executing one or more applications, memory in the form of flash memory 1750 and RAM 1752 (or any equivalent memory devices) for storing the one or more applications and related data, and a user interface 1720 with which the user interacts with the device. The user interface 1720 may include a display 1722 and a touch screen 1726.

As shown by way of example in FIG. 17, the portable device 100 includes a radiofrequency (RF) transceiver comprising a receiver 1712 and associated receiver antenna 1716 and transmitter 1714 and associated transmitter antenna 1718. The RF transceiver for communication with a wireless network 1702 using a wireless communication protocols such as, for example but not limited to, GSM, UMTS, LTE, HSPDA, CDMA, W-CDMA, Wi-MAX, etc. A subscriber identify module (SIM) card 1754 may be provided. Optionally, where the portable device is a voice-enabled communications device such as, for example, a tablet, Smartphone or cell phone, the device would further include a microphone 1758 and a speaker 1756. Short-range communications is provided through wireless technologies such as Bluetooth™ or wired Universal Serial Bus™ connections to other peripherals or computing devices or by other device sub-systems 1740. This device may optionally include a Global Positioning System (GPS) receiver chipset 1780 or other location-determining subsystem.

The portable device 100 also includes an operating system 1760 and software components 1762 to 1768 which are described in more detail below. The operating system 1760 and the software components 1762 to 1768 that are executed by the microprocessor 1710 are typically stored in a persistent store such as the flash memory 1750, which may alternatively be a read-only memory (ROM) or similar storage element (not shown). Those skilled in the art will appreciate that portions of the operating system 1760 and the software components 1762 to 1768, such as specific device applications, or parts thereof, may be temporarily loaded into a volatile store such as the RAM 1752. Other software components can also be included, as is well known to those skilled in the art.

The subset of software applications that control basic device operations, including data and voice communication applications, may be installed on the portable device 100 during its manufacture. Other software applications include a message application 1762 that can be any suitable software program that allows a user of the portable device 100 to send and receive electronic messages. The messaging application 1762 may include functionality for providing the searching functionality described herein. Additionally or alternatively, the searching functionality may be provided as a separate component or incorporated into an existing component of the device. The software applications can further comprise a device state module 1766, a social network application 1768, and other suitable modules (not shown). The device state module 1766 provides persistence, i.e. the device state module 1766 ensures that device data is stored in persistent memory, such as the flash memory 1750, so that the data is not lost when the portable device 100 is turned off or loses power. The social networking application 1768 includes functionality for interacting with one or more social networks. The device may also comprise one or more message stores 1790 that stores messages for the user of the device. Additionally or alternatively, one or more of the message stores used to store and search messages may be stored on a remote server accessible by the portable device, depicted as remote message stores 1792 coupled to the wireless network 1702.

Some examples of other software components 1764 that may be executed by the operating system 1760 may include, e-mail, peer-to-peer or instant messaging application, social networking, mapping, internet browser, calendar, address book and phone applications It will be appreciated that the various applications may operate independently or may utilize features of other applications. For example, the phone application and messaging application may use the address book for contact details.

Figure 18:
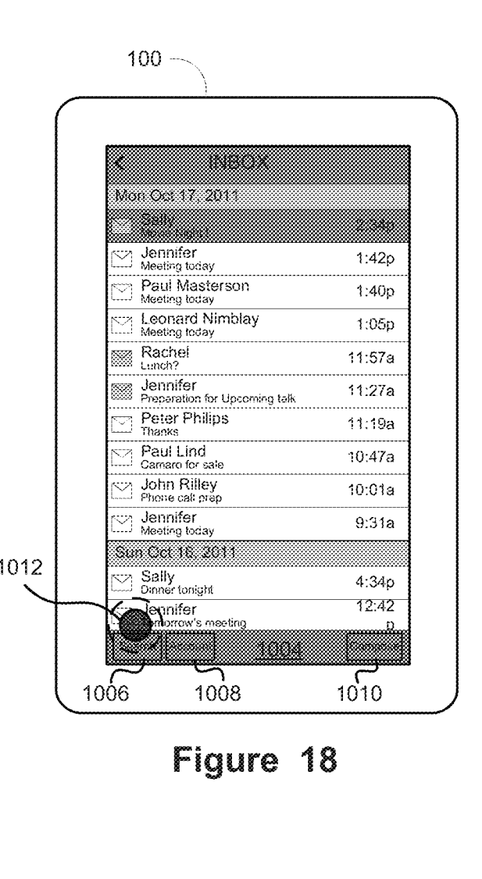
FIG. 18 depicts a method for searching a message store.
Figure 19:
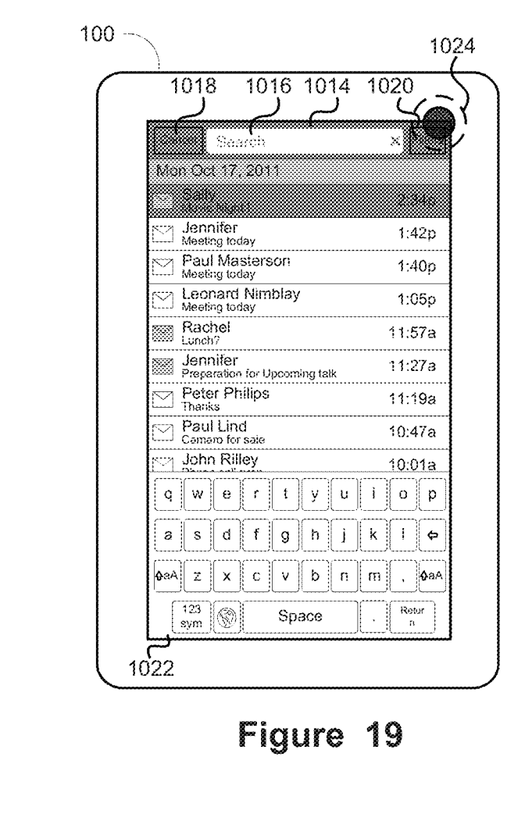
FIG. 19 depicts a further method for searching a message store.
Figure 20:
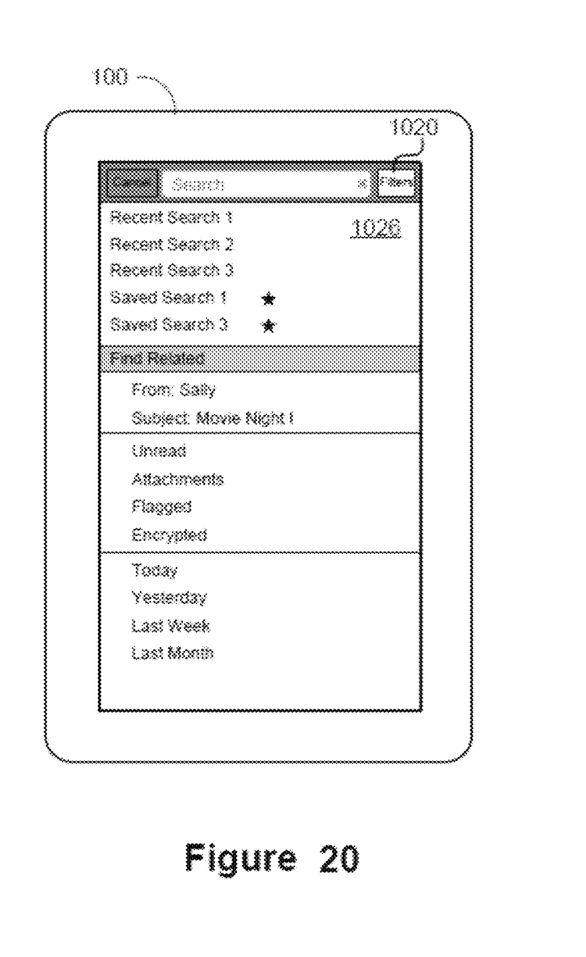
FIG. 20 depicts an apparatus that may be used to search a message store.

FIGS. 18 to 20 depict various screens of a portable device used for searching a message store. As is evident in the figures, the device 100 is in a portrait orientation. The functionality provided for searching the message store is substantially the same as described above. Since there is less horizontal screen real-estate for simultaneously displaying a search pane as well as a message pane as described above, the search or filter screen may be displayed as a separate panel.

Turning to FIG. 18, a message list pane 1002 is displayed. As will be appreciated, the message list pane 1002 can display various types of messages received from different accounts. An action bar 1004 may be displayed at the bottom of the message list pane 1002. The action bar 1004 can provide icons for selecting actions to be performed. As depicted, the action bar 1004 may include a search icon 1006 for displaying a search bar, an account icon 1008 for allowing a user to select an account displayed in the message list pane 1002, and a compose icon 1010 for composing a new message.

When a user taps on the search icon 1006 as depicted by circle 1012, or otherwise indicates that a search is to be performed such as through a menu selection, gesture or command, a search pane 1014 is displayed as depicted in FIG. 19.

In order to increase the screen real-estate available for displaying messages, the initial search pane 1014 may provide a simple search box 1016 for entering search terms. The search pane 1014 may further include icons for cancelling the search 1018 as well as an icon 1020 for displaying an advanced search pane. When the search pane 1014 is initially displayed, a keyboard 1022 may also be displayed to allow a user to immediately begin entering search criteria.

When the user selects the advanced search or filter option, for example by tapping the icon 1020 as depicted by circle 1024, a criteria selection pane 1026 may be displayed in place of the message list pane 1002 as depicted in FIG. 20. The criteria selection pane 1026 may provide substantially the same functionality as described above with regards to the criteria selection pane 118. The criteria selection pane 1026 allows the user to search, select and refine search criteria that are used for search the message store. When the criteria selection pane is displayed, the appearance of the icon 1020 may be modified to highlight that the criteria selection pane

1026 is currently displayed. By tapping the icon 1020 again, the criteria selection pane 1026 may close and the message list pane 1002 displayed.

As will be appreciated, the search and functionality provided in both the portrait and landscape orientations are substantially the same. However, in order to improve the amount of vertical space available for displaying messages to the user in the portrait orientation, the search panes are separated into two panes. The first provides a basic search box and as such can be displayed with the message list pane, while the second provides more advanced options and replaces the message list pane. The transitions between displayed panes may be animated. Further, the switch between the portrait and landscape orientations may also be animated.

Although certain methods, apparatus, and articles of manufacture have been described herein, the scope of coverage of this patent is not limited thereto. To the contrary, this patent covers all methods, apparatus, computer readable memory, and articles of manufacture fairly falling within the scope of the appended claims either literally or under the doctrine of equivalents.

What is claimed is:

1. A method for searching a message store on a portable device comprising:
   displaying a search input box for searching the message store relative to a currently displayed message on the portable electronic device;
   displaying a plurality of defined message fields corresponding to searchable fields in message store;
   displaying one or more characters input by a user in the search input box;
   generating and displaying a first plurality of possible search criteria based on the displayed one or more characters by appending the displayed one or more characters input to one or more of the displayed plurality of defined message fields for searching for messages in the message store having the one or more characters in the respective defined message field;
   receiving a selection of one or more of the displayed first plurality of the possible search criteria;
   generating and displaying a second plurality of possible search criteria based on one or more terms containing characters in terms extracted from a body of the currently displayed message, by appending the one or more terms to one or more of the displayed plurality of defined message fields;
   receiving a selection of one or more of the displayed second plurality of the possible search criteria;
   adding the selected one or more possible first or second search criteria to a search string displayed in the search input box within a box or outline for each selected one or more possible search criteria;
   displaying the selected one or more possible search criteria in the search input box; and
   searching the message store based on the search string, wherein each of the one or more possible search criteria is removable from the search string by selection of the search input box or outline and wherein generating the second plurality of possible search criteria is based on at least a portion of the content of the current message and comprises generating a plurality of possible search criteria based on one or more keywords generated from the portion of the content of the current message.

2. The method of claim 1, wherein generating the second plurality of possible search criteria further comprises: selecting one or more terms from an index of possible search terms pre-indexed from the message store that at least partially match the displayed one or more characters.

3. The method of claim 1, wherein the defined message fields comprise a plurality of:
   searching a message's To field for the displayed one or more characters;
   searching a message's From field for the displayed one or more characters;
   searching a message's CC field for the displayed one or more characters;
   searching a message's BCC field for the displayed one or more characters;
   searching a message's Subject field for the displayed one or more characters; and
   searching a message's Body field for the displayed one or more characters.

4. The method of claim 1, wherein generating and displaying the second plurality of possible search criteria further comprises generating and displaying one or more of the plurality of possible search criteria based on at least a portion of content of the current message and messages stored in the message store.

5. The method of claim 1, wherein the defined message fields comprise a plurality of:
   searching a message's To field for the one or more keywords;
   searching a message's From field for the one or more keywords;
   searching a message's CC field for the one or more keywords;
   searching a message's BCC field for the one or more keywords;
   searching a message's Subject field for the one or more keywords; and
   searching a message's Body field for the one or more keywords.

6. The method of claim 1, wherein the message store comprises one or more message stores stored locally or remotely accessible by the portable device.

7. The method of claim 1, wherein the message store stores messages of one or more different message types comprising one or more of:
   e-mail messages;
   social network messages;
   short message service (SMS) text messages; and
   messaging application messages.

8. A portable device comprising:
   a touch sensitive display for displaying graphics and receiving touch input;
   a memory for storing instructions;
   a processor for executing the instructions, the instructions when executed by the processor configuring the portable device to:
      display a search input box on the touch sensitive display for searching the message store relative to a currently displayed message on the portable electronic device;
      display a plurality of defined message fields corresponding to searchable fields in message store;
      display one or more characters input by a user in the search input box;
      generate and display a first plurality of possible search criteria based on the displayed one or more characters by appending the displayed one or more characters input to one or more of the displayed plurality of defined message fields for searching for messages in the message store having the one or more characters in the respective defined message field;

receive a selection of one or more of the displayed first plurality of the possible search criteria;

generate and display a second plurality of possible search criteria based on one or more terms containing the characters in terms extracted from a body of the currently displayed message, by appending the one or more terms to one or more of the displayed plurality of defined message fields;

receive a selection of one or more of the displayed second plurality of the possible search criteria;

add the selected one or more possible first or second search criteria to a search string displayed in the search input box within a box or outline for each selected one or more possible search criteria wherein each of the one or more possible search criteria is removable from the search string by selection of the search input box or outline;

display the selected one or more possible search criteria in the search input box; and search the message store based on the search string,
wherein the generating of the second plurality of possible search criteria is based on at least a portion of the content of the current message and comprises generating a plurality of possible search criteria based on one or more keywords generated from the portion of the content of the current message.

9. The portable device of claim 8, wherein the instructions when executed by the processor further configure the portable device to:

generate the second plurality of possible search criteria by further selecting one or more terms from an index of possible search terms pre-indexed from the message store that at least partially match the displayed one or more characters.

10. The portable device of claim 8, wherein the defined message fields comprise a plurality of:

searching a message's To field for the displayed one or more characters;

searching a message's From field for the displayed one or more characters;

searching a message's CC field for the displayed one or more characters;

searching a message's BCC field for the displayed one or more characters;

searching a message's Subject field for the displayed one or more characters; and searching a message's Body field for the displayed one or more characters.

11. The portable device of claim 8, wherein the instructions when executed by the processor further configure the portable device to generate and display a second plurality of possible search criteria based on at least a portion of the content of the current message and messages stored in the message store.

12. The portable device of claim 8, wherein the message store comprises one or more message stores stored locally or remotely accessible by the portable device each having one or more different message types comprising one or more of:

e-mail messages;
social network messages;
short message service (SMS) text messages; and
messaging application messages.

13. A non-transitory computer readable memory containing instructions for searching a message store on a portable device, the instructions when executed by a processor performing:

displaying a search input box for searching the message store relative to a currently displayed message on the portable electronic device;

displaying a plurality of defined message fields corresponding to searchable fields in message store;

displaying one or more characters input by a user in the search input box;

generating and displaying a first plurality of possible search criteria based on the displayed one or more characters by appending the displayed one or more characters input to one or more of the displayed plurality of defined message fields for searching for messages in the message store having the one or more characters in the respective defined message field;

receiving a selection of one or more of the displayed first plurality of the possible search criteria;

generating and displaying a second plurality of possible search criteria based on one or more terms containing characters in terms extracted from a body of the currently displayed message by appending the one or more terms to one or more of the displayed plurality of defined message fields;

receiving a selection of one or more of the displayed second plurality of the possible search criteria;

adding the selected one or more possible first or second search criteria to a search string to the search input box with within a box or outline for each selected one or more possible search criteria wherein each of the one or more possible search criteria is removable from the search string by selection of the box or outline;

displaying the selected one or more possible search criteria in the search input box; and searching the message store based on the search string, wherein generating the second plurality of possible search criteria is based on at least a portion of the content of the current message and comprises generating a plurality of possible search criteria based on one or more keywords generated from the portion of the content of the current message.

* * * * *